(12) United States Patent
Benejam et al.

(10) Patent No.: US 7,133,915 B2
(45) Date of Patent: Nov. 7, 2006

(54) APPARATUS AND METHOD FOR OFFLOADING AND SHARING CPU AND RAM UTILIZATION IN A NETWORK OF MACHINES

(75) Inventors: Roberto Benejam, Pflugerville, TX (US); Oluyemi Babatunde Saka, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 10/268,260

(22) Filed: Oct. 10, 2002

(65) Prior Publication Data

US 2004/0073908 A1    Apr. 15, 2004

(51) Int. Cl.
G06F 15/177    (2006.01)
(52) U.S. Cl. ............. 709/224; 709/223; 709/229; 715/736
(58) Field of Classification Search ............. 709/223; 718/100, 105
See application file for complete search history.

(56) References Cited

U.S. PATENT DOCUMENTS

| | | | | |
|---|---|---|---|---|
| 5,583,862 A | | 12/1996 | Callon | 370/397 |
| 5,881,284 A | * | 3/1999 | Kubo | 718/100 |
| 6,006,248 A | * | 12/1999 | Nagae | 718/105 |
| 6,111,876 A | | 8/2000 | Frantz et al. | 370/392 |
| 6,112,085 A | | 8/2000 | Garner et al. | 455/428 |
| 6,205,147 B1 | | 3/2001 | Mayo et al. | 370/397 |
| 6,587,938 B1 | * | 7/2003 | Eilert et al. | 712/29 |

* cited by examiner

Primary Examiner—Lewis A. Bullock, Jr.
(74) Attorney, Agent, or Firm—David A. Mims, Jr.; Rudolf O. Siegesmund; Gordon & Rees, LLP

(57) ABSTRACT

A Virtual Network Resource Sharing (VNRS) system having a CPU and RAM offloading and sharing program is disclosed. The CPU and RAM offloading and sharing program modifies CPU and RAM utilization among participating machines. The VNRS program analyzes the CPU and RAM usage on a plurality of machines connected via a virtual network, specifically the applications running on those machines. The VNRS program reorganizes the applications amongst the participating computers such that the optimum performance is achieved for the network.

12 Claims, 10 Drawing Sheets

APPARATUS AND METHOD FOR OFFLOADING AND SHARING CPU AND RAM UTILIZATION IN A NETWORK OF MACHINES

CROSS REFERENCE TO RELATED APPLICATIONS

The present application is related to the subject matter of U.S. patent application Ser. No. 10/268,286 incorporated herein by reference.

FIELD OF THE INVENTION

The present invention is related generally to field of computers, and specifically to the sharing of resources in a remote control environment.

BACKGROUND OF THE INVENTION

It is frequently desired to run multiple applications on a single computer. In running a multiple application environment, it is desirable to limit the processor and RAM usage as much as possible. This goal is especially important in a networked environment where a plurality of computers may be running the same applications or may be similarly configured. The overall speed of computers in a network is related to the CPU and the RAM utilization of the individual computers in the network. Therefore it is desirable to be able to offload applications from computers with a higher CPU and RAM utilization to computers with a lower CPU and RAM utilization.

Present systems allow control of a remote machine by a local machine and sharing of resources between the local machine and the remote machine. For example IBM Tivoli Remote Control permits control of a remote machine. Symantec PC Anywhere permits a user to connect to other computers or servers in order to transfer files or run applications. Win2VNC allows the operator to use two screens on two different computers as if they were connected to the same computer but does not permit transfer of files. Virtual Network Computing (VNC) is a remote display system which allows a user to view a computing desktop running on a first machine on any other machine connected to the first machine by the Internet. Virtual Machine (VM) software takes a portion of a hard disk, a portion of a CPU and a portion of the RAM associated with the CPU from a first machine to create a second virtual machine. VM software assigns CPU as needed among virtual machines. VM software allows the machine to be preset so that different operating systems can be run in the VM environment. However, VM software does not allow offloading and sharing of CPU and RAM resources. Tivoli Enterprise Management has Tivoli Inventory, an inventory scan software program that can identify applications available within the systems it can scan.

Several patents address the architecture of virtual networks. See, for example, U.S. Pat. Nos. 6,205,147, 6,112,085, 6,111,876, and 5,586,862. However what is need beyond the prior art is a method and apparatus for resource sharing in a virtual network.

A need exists to reduce over utilization of the CPU processing capability and the Random Access Memory (RAM) of a computer in a virtual network or in a network of physically connected machines. Specifically, a need exists to maximize CPU processing power and RAM utilization on local computers and remote computers. A need exists to increase CPU and RAM performance through selective offloading (distribution) of processes. A need exists to permit dedication to critical processes of CPU and RAM utilization on a local machine. A need exists to share resources with a remote machine (CPU process and RAM). A need exists for CPU utilization sharing as add-on functionality to existing tools such as Tivoli Remote Control software, PC Anywhere software, Virtual Network Computing software and Virtual Machine software.

SUMMARY OF THE INVENTION

The system that meets the needs identified above is a Virtual Network Resource Sharing (VNRS) system having a CPU and RAM offloading and sharing program. The CPU and RAM offloading and sharing program modifies CPU and RAM utilization among participating VNRS machines. Participating machines are identified. A participating network of participating machines is created. The CPU and RAM utilization for each CPU and RAM in each of the participating machines is monitored. A CPU threshold and RAM threshold each machine is chosen. A determination is made as to whether the CPU and RAM utilization exceeds the threshold. Applications to be processed on a remote participating machine where removal of that process from the local CPU and local RAM will lower the local CPU and local RAM utilization below the threshold are selected. Available participating machines that do not exceed the CPU and RAM threshold are identified. Available participating machines that have the application available, and that with the application running will not exceed the CPU and RAM threshold are identified. The application for the local machine is run on the selected available participating machine and the application processing on the local machine is shut down and memory released.

DETAILED DESCRIPTION OF THE PREFERRED EMBODIMENT

As used herein, the term Internet Protocol (IP) means a protocol used to route data from its source to its destination in an Internet, Local Area Network (LAN) or Wide Area Network (WAN) environment.

As used herein, the term domain means the part of a computer network in which the data processing resources are under common control.

As used herein, the term primary farm means a plurality of computers that are identically configured, that have an identical set of applications in the memory of each of the plurality of computers, and that are connected to each other by one or more networks.

As used herein, the term secondary farm means a plurality of computers that have one or more computers that are not identically configured, that have one or more computers where the applications some of the computers are different from the applications in the memory of the remaining computers, and where each of the plurality of computers are connected to each other by one or more networks.

As used herein, the term offloading means to run a program that is located in the memory of a first machine using the CPU and RAM of a second machine.

As used herein, the term virtual network means a network that has no physical connection between computers and the connection is established by means of an IP address.

As used herein the term physically connected network means a network where two or more computers are connected via direct cable and local area network.

As used herein, the term IP address means a unique code assigned to each device or workstation connected to a network.

As used herein, the terms computer and machine refer to nay analog or digital processing device and are used interchangeably.

Figure 1A:
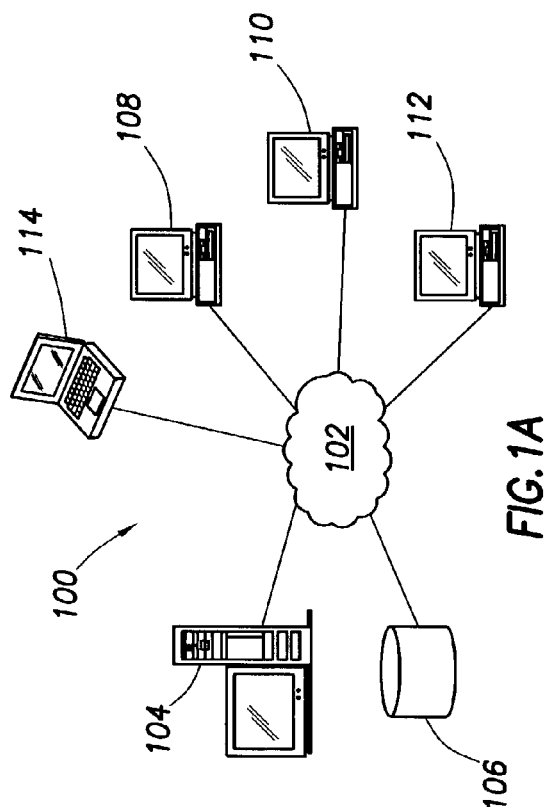
FIG. 1A is an illustration of a distributed data network.

FIG. 1A depicts a pictorial representation of a distributed data processing system 100 in which the present invention may be implemented and is intended as an example, and not as an architectural limitation, for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, 112, and 114 also are connected to a network 102. Clients 108, 110, 112, and 114 may be, for example, personal computers or network computers and may be desktops, laptops, or servers.

For purposes of this application, a network computer is any computer, coupled to a network, which receives a program or other application from another computer coupled to the network. In the depicted example, server 104 provides applications to clients 108, 110, 112, and 114. Clients 108, 110, 112, and 114 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 1B:
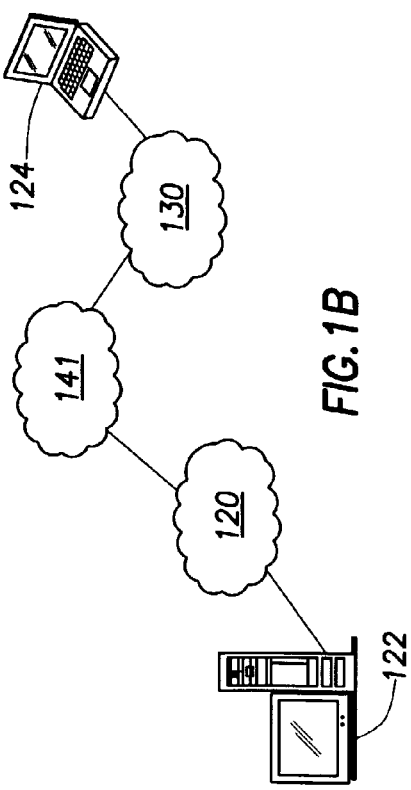
FIG. 1B is an illustration of two connected networks.

FIG. 1B depicts network A 120 connected to network B 130 by the Internet 141. Laptop 124 is connected to network B 130. Desktop 122 is connected to network A 120. Laptop 124 and desktop 122 may be connected to each other by VNRS program 400 residing in the memory of desktop 122 and in the memory of laptop 124.

Figure 1C:
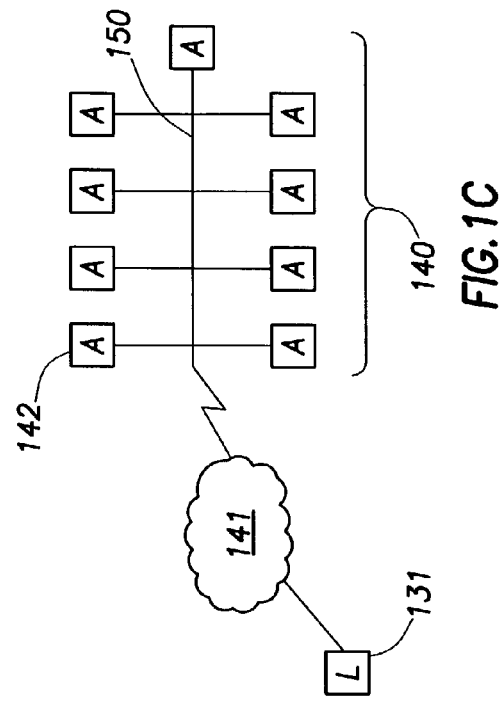
FIG. 1C is an illustration of a primary farm.

FIG. 1C depicts local computer 131 connected to primary farm 140 by Internet 141. Primary farm network 150 comprises a plurality of computers with similar configurations (hereinafter configuration "A" machine 142). Primary farm 140 in FIG. 1C has nine configuration "A" machines 142 connected to Internet 141 by primary farm network 150.

Figure 1D:
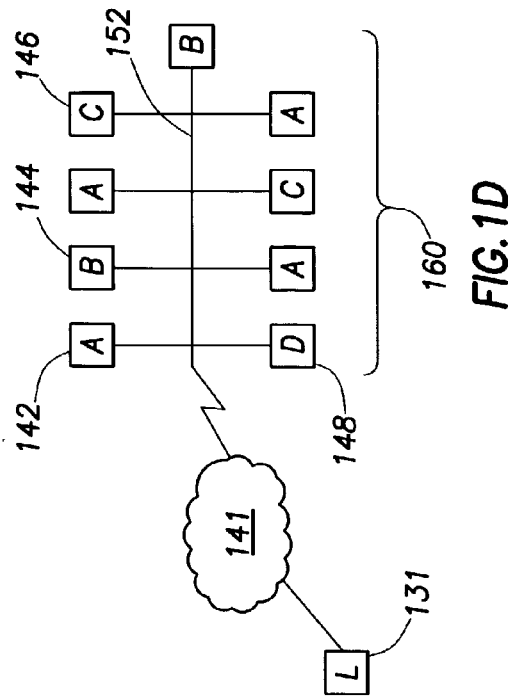
FIG. 1D is an illustration of a secondary farm.

FIG. 1D depicts local computer 131 connected to secondary farm 160 by Internet 141. Secondary farm 160 has four configuration "A" machines 142, two configuration "B" machines 144, two configuration "C" machines 146, and one configuration "D" machine 148 connected to each other by secondary farm network 152.

Figure 2:
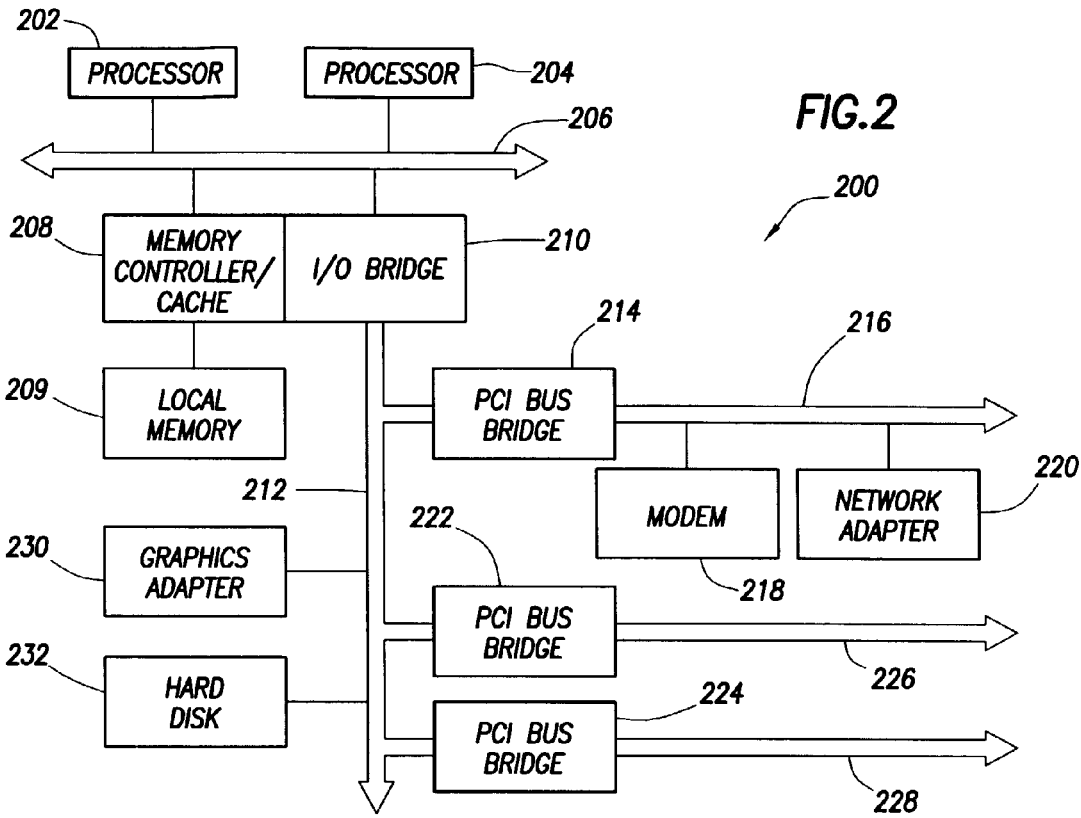
FIG. 2 is an illustration of a data processing system.

Referring to FIG. 2, a block diagram depicts a data processing system 200, which may be implemented as a server, such as server 104 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. First peripheral component interconnect (PCI) bus bridge 214 connected to I/O bus 212 provides an interface to first PCI local bus 216. Modem 218 may be connected to first PCI local bus 216. Typical PCI bus implementations will support four PCI expansion slots or add-in connectors. Communications links to network computers 108, 110, 112 and 114 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
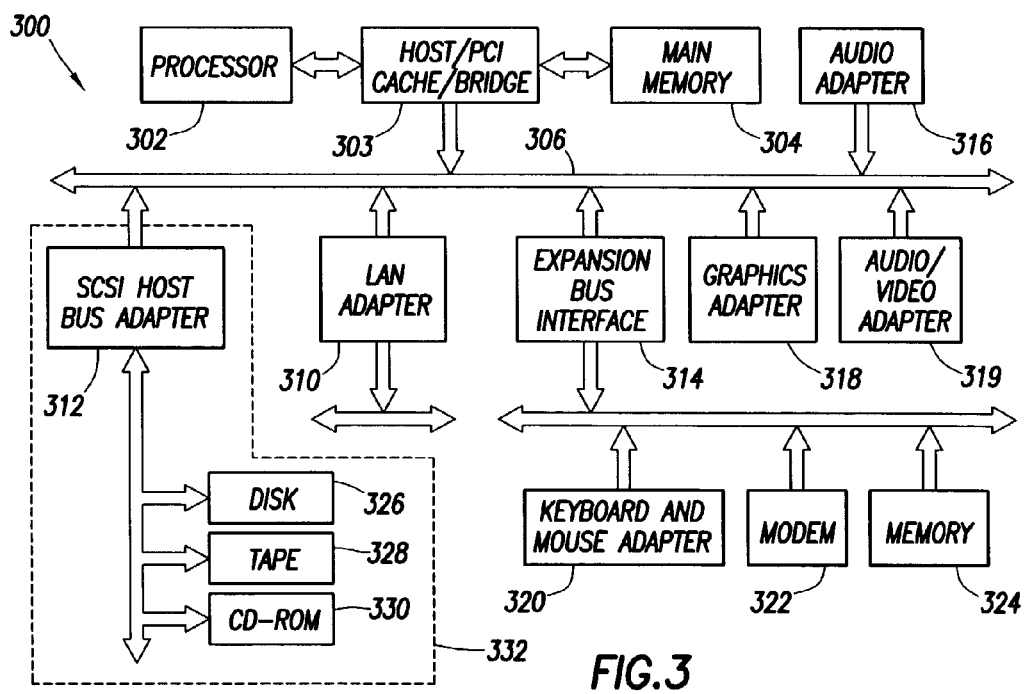
FIG. 3 is an illustration of a data processing system.

With reference now to FIG. 3, a block diagram illustrates a data processing system 300 in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as Microsoft Windows or OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a standalone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Figure 4:
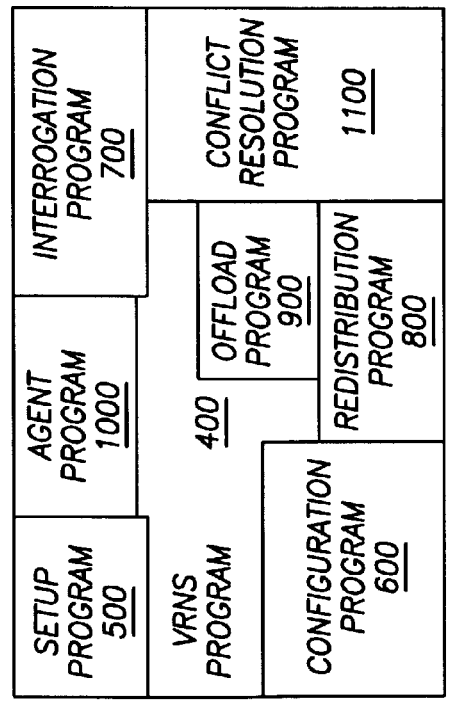
FIG. 4 is an illustration of the VNRS program having a CPU offloading and sharing program.

FIG. 4 depicts VNRS program 400 having setup program 500, interrogation program 700, agent program 1000, redistribution program 800, conflict resolution program 1100, configuration program 600 and offload program 900.

Figure 5:
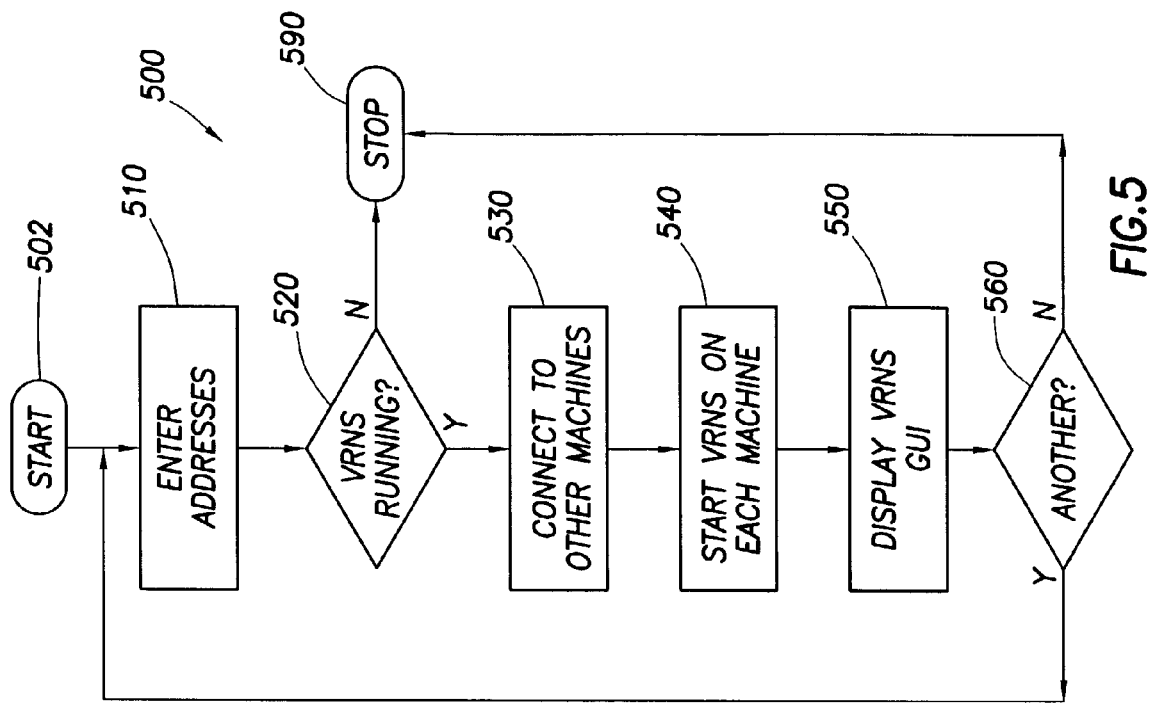
FIG. 5 is a flowchart of the setup program.

FIG. 5 depicts a flowchart for setup program 500. Setup program 500 is run on the local machine and connects the other machines to the local machine via a virtual network. Alternatively, the machines could be connected via a traditional LAN or WAN. Setup program 500 begins (502) and the user enters the IP addresses for the machines in the network (510). A determination is made as to whether VNRS program 400 is running on the local machine (520). If not, setup program 500 ends (590). If VNRS program 400 is running on the local machine, then setup program 500 connects each machine (530). Setup program 500 starts VNRS program 400 on each connected machine (540). The VNRS GUI similar to CPU utilization GUI 1300 (See FIG. 13) is displayed on the user's machine (550). A determination is made as to whether another machine is to be added (560). If not, setup program 500 ends (590). If another machine is to be added, setup program 500 goes to step 510.

Figure 6:
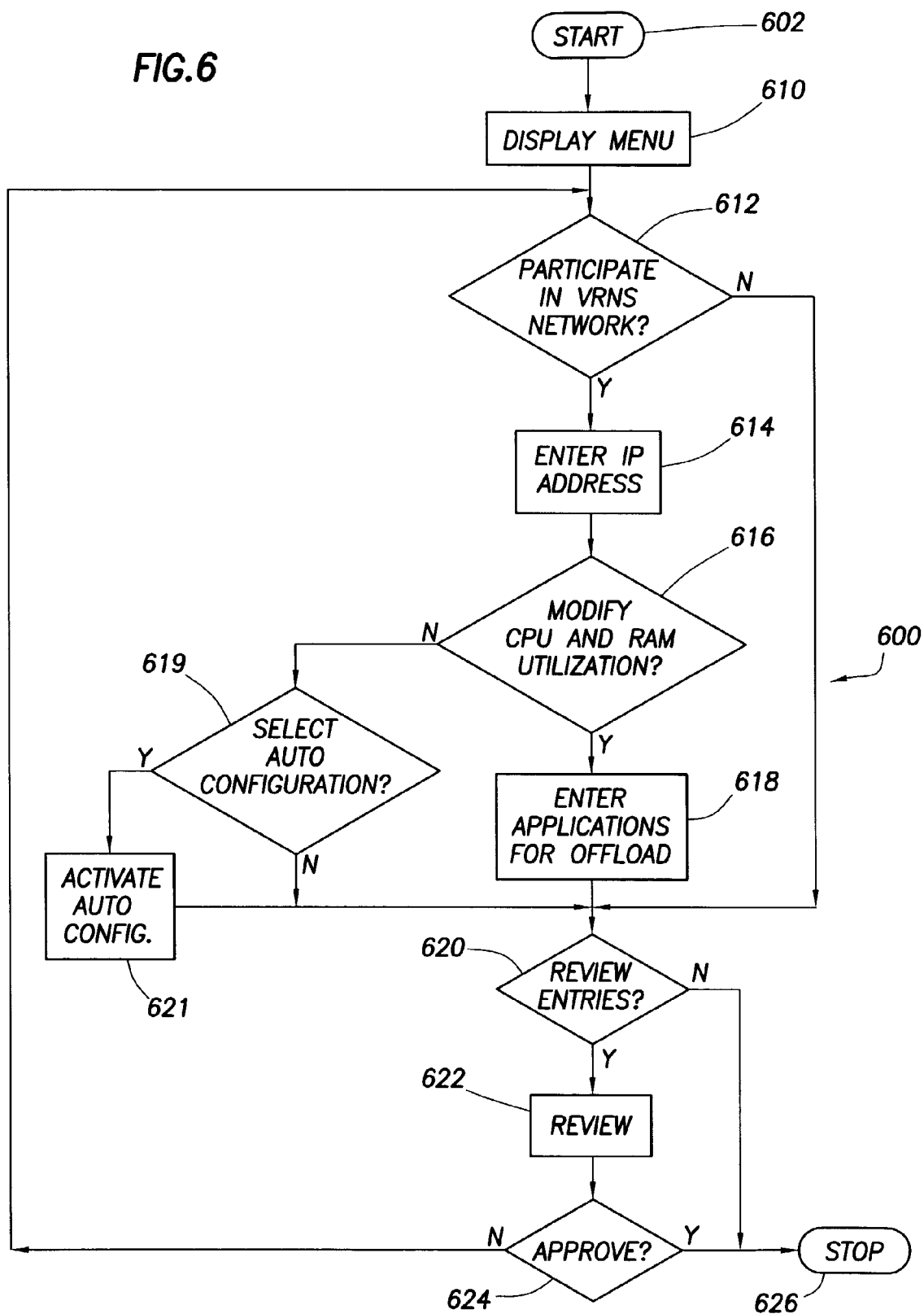
FIG. 6 is a flowchart of the configuration program.

FIG. 6 depicts a flowchart for configuration program 600. Configuration program 600 allows the user to identify the machines that will participate in resource sharing and also identify the applications to share amongst the participating machines. Configuration program 600 begins (602) and a menu is displayed (610). The menu lists all of the machines connected to the user's computer. The menu allows the user to identify machines that will participate in resource sharing. A determination is made as to whether the user wants to participate in the VNRS network (612). If the user does not want to participate, then configuration program 600 goes to step 620. If the user wants to participate, then the user enters the IP address for the user's machine (614). Next, a determination is made as to whether the user wants to modify CPU and RAM utilization within the network (616). If the user does not want to modify CPU and RAM utilization, then configuration program 600 goes to step 619. If the user wants to modify CPU and RAM utilization within the network, then the user configures the applications amongst the machines (618). A determination is made as to whether the user wants offload program 900 (See FIG. 9) to configure the applications (619). If auto configuration has been selected, then offload program 900 is activated for the IP address entered at step 614 (621). If auto configuration is not selected, then configuration program 600 goes to step 620. A determination is made as to whether the user wants to review the entries (620). If the user does not want to review entries, configuration program 600 ends (626). If the user wants to review entries, the entries are made available for review (622) and a determination is made as to whether the entries are approved (624). If the user approves the entries, configuration program 600 ends (626). If not, configuration program 600 goes to step 612.

Figure 7:
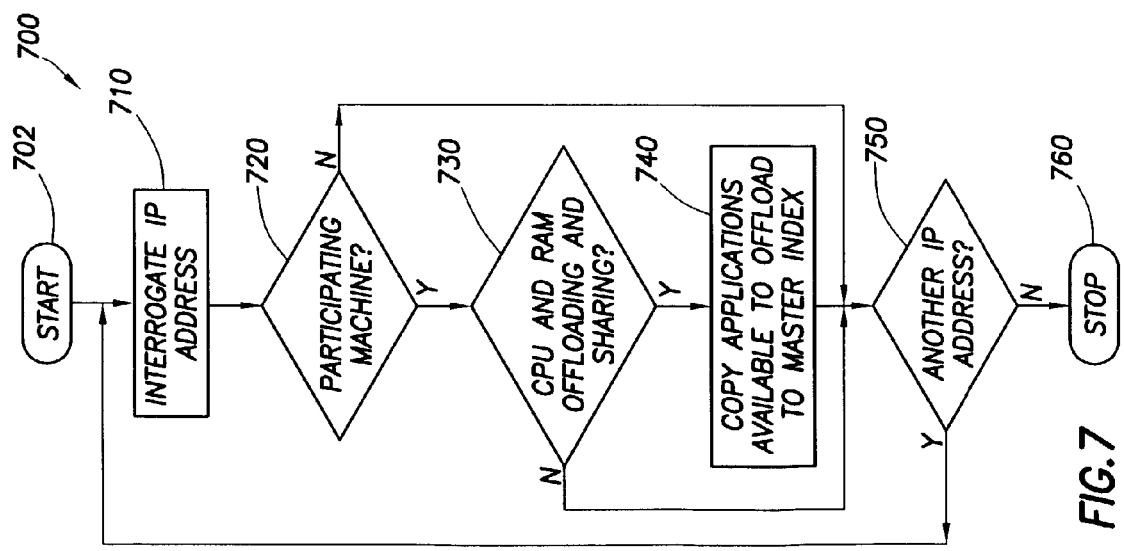
FIG. 7 is a flowchart of the interrogation program.

FIG. 7 is a flowchart of interrogation program 700. Interrogation program 700 begins (702) and interrogates all IP address in the VNRS network (710). A determination is made as to whether each IP address belongs to a participating machine (720). If not, interrogation program 700 goes to step 750. If the IP address belongs to a participating machine, a determination is made as to whether the participating machine has elected CPU and RAM offloading and sharing (730). If not, interrogation program 700 proceeds to step 750. If the participating machine has elected CPU and RAM offloading and sharing, the CPU utilization for the machine at the IP address is copied to the host machine's master CPU file and the RAM utilization for the machine at the IP address is copied to the host machine's master RAM file (740). A determination is made as to whether there is another IP address (750). If there is another IP address, then interrogation program 700 goes to step 710. If not, interrogation program 710 stops (760).

Figure 8:
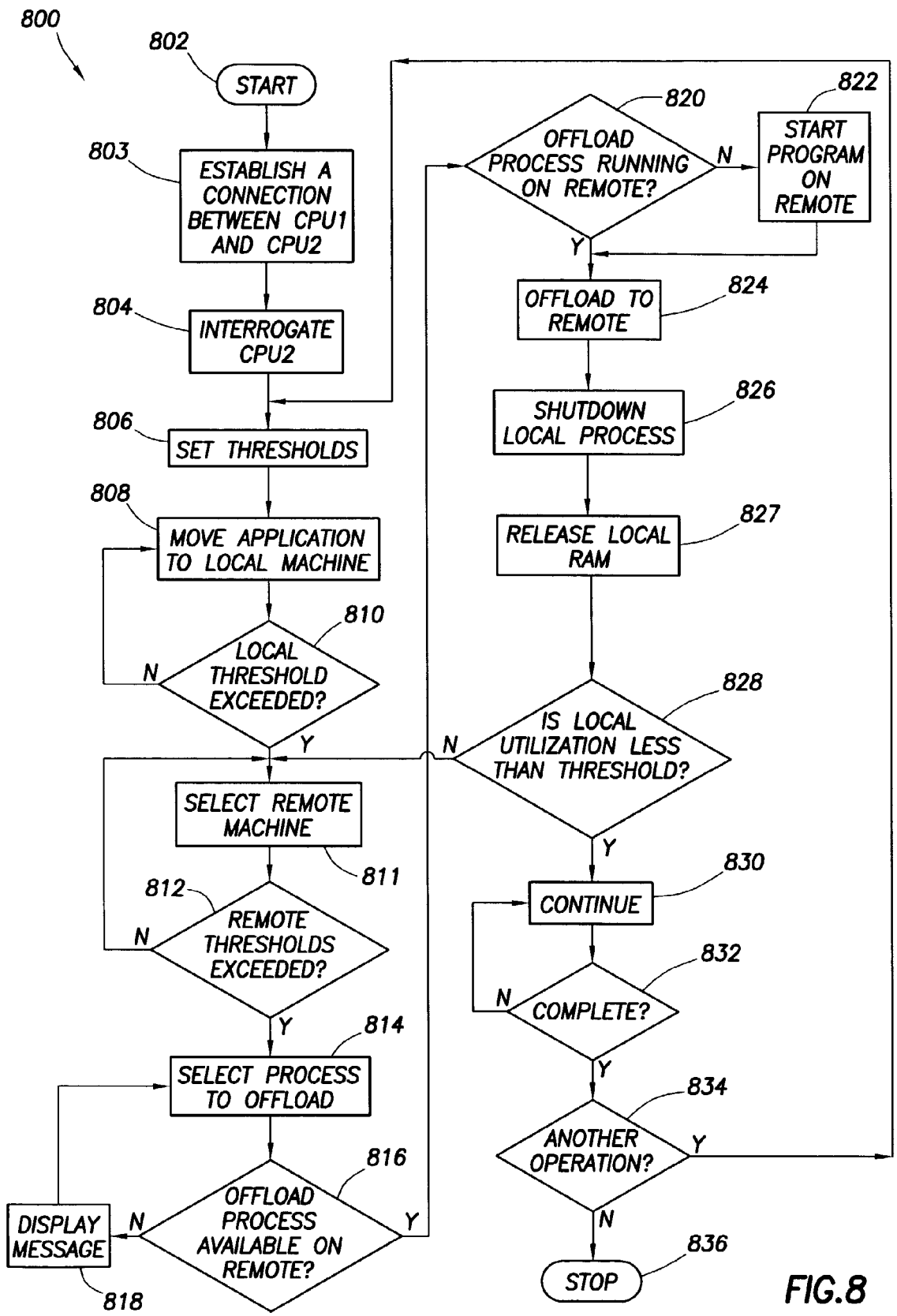
FIG. 8 is a flowchart of the redistribution program.

FIG. 8 depicts a flowchart of redistribution program 800. Redistribution program 800 starts (802) and establishes a connection between the local computer (CPU1) and a remote computer (CPU2) (803). Interrogation program 700 interrogates the remote computer (804). The user establishes the CPU utilization threshold and the RAM utilization threshold (806). The CPU utilization threshold is the maximum specified amount of processor usage for a given machine. The RAM utilization threshold is the maximum specified amount of memory usage for a given machine. An application is then moved to the local machine (808). The order of moving the applications to the local machine is a matter of preference and is best determined by persons skilled in the art. A determination is made as to whether the local CPU utilization is above the established CPU threshold and whether the local RAM utilization is above the RAM utilization threshold (810). If the local CPU utilization is not above the established threshold and the local RAM utilization is not above the established threshold, then redistribution program 800 returns to step 808. If the local CPU utilization is above the CPU utilization threshold and the local RAM utilization is above the RAM utilization threshold, then a remote machine is selected (811). After a remote machine is selected, a determination is made as to whether the remote machine CPU (CPU 2) utilization is above the CPU utilization threshold and/or the remote machine RAM (RAM 2) utilization is above the RAM utilization threshold (812). If the CPU utilization for the selected remote machine is above the CPU threshold and/or the RAM utilization for the selected remote machine is above the RAM threshold, then the application cannot be offloaded and another machine must be examined and redistribution process 800 returns to step 811. If the remote CPU utilization is not above the threshold and the remote RAM utilization is not above the RAM threshold, the user selects the process to offload (814). Alternatively, redistribution program 800 can automatically offload an application either using offload program 900 or as otherwise determined by persons skilled in the art. Redistribution program 800 then determines if the remote machine can accept the selected application (816). If the remote machine cannot accept the selected application, then a message is displayed stating "Unable to offload application" (818) and returns to step 814. If the application can be offloaded, then a determination is made as to whether the process to be offloaded is running on the selected remote machine (820). If the process to be offloaded is not running on the remote machine, then the program is started on the remote machine (822). If the process to be offloaded is running on the remote machine, then the application is offloaded to the remote machine (824). Next, redistribution program 800 shuts down the application on the local machine (826) and releases RAM memory on the local machine (827). A determination is made as to whether the local CPU utilization is under the CPU utilization threshold and whether the local RAM utilization is under the RAM utilization threshold (828). If the local CPU utilization is over the CPU utilization threshold and the RAM utilization is over the RAM utilization threshold, redistribution program 800 goes to step 811. If the local CPU utilization is under the CPU utilization threshold and the local RAM utilization is under the RAM utilization threshold, then the application continues to run on the local machine (830). A determination is made as to whether the operations are complete (832). If the operations are not complete, the CPU and Ram offloading and sharing redistribution program 800 goes to step 830. If the operations are complete, redistribution program 800 goes to step 834 where a determination is made as to whether there is another operation (834). If there is another operation, redistribution program 800 goes to step 806. If there is not another operation, redistribution program 800 ends (836).

Figure 9:
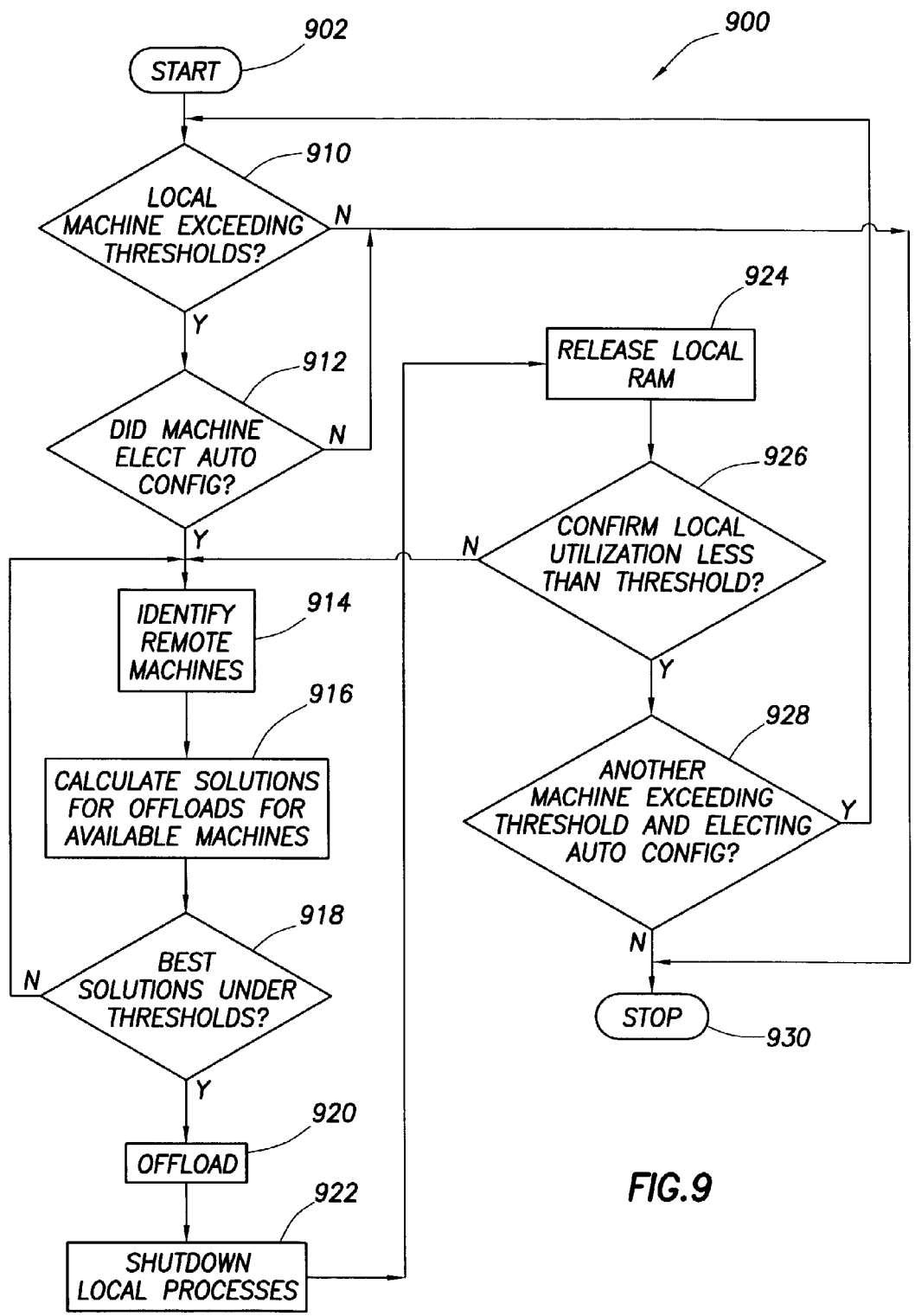
FIG. 9 is a flowchart of the offload program.

FIG. 9 depicts a flowchart of offload program 900, similar to offload program 460. Offload program 900 starts (902) and a determination is made as to whether a local machine is exceeding its CPU and RAM thresholds (910). If the CPU and RAM utilization thresholds are not exceeded, offload program 900 stops (930). If the CPU and RAM utilization thresholds are exceeded, a determination is made as to whether the local machine elected auto configuration (912). If the local machine did not elect auto configuration, offload program 900 stops (930). If the local machine did elect auto configuration, Offload program 900 identifies remote machines that are available for sharing CPU and RAM resources (914). Offload program 900 identifies the machines that have CPU and RAM resources that are less than the respective threshold for each machine. The selected machines are ranked in order, with the machine with the greatest difference between actual usage and the CPU and RAM thresholds ranked first, and so on. Offload program 900 calculates a solution for each machine (916). The solution calculated by offload program 900 determines the CPU and RAM utilization for both the local machine and the remote machine after offloading for each machine. A solution is calculated for each possible application that can be offloaded for each remote machine. A determination is made as to whether a best solution has been found (918). By best solution is meant the most efficient CPU and RAM utilization for the local machine. If a best solution has not been found, offload program 900 goes to step 914 and begins again. If a best solution is found, then offload program 900 offloads the selected application to the selected remote machine (920). Offload program 900 then shuts down the local machine process or application that has been offloaded (922). Offload program 900 then releases the local RAM (924). A determination is made as to whether the CPU and RAM utilization at the local machine is less than the CPU and RAM thresholds for the local machine (926). If the CPU and RAM utilization at the local machine is not less than the CPU and RAM thresholds for the local machine, offload program 900 goes to step 914. If the CPU and RAM utilization is less than the CPU and RAM thresholds, a determination is made as to whether there is another machine exceeding its thresholds and electing auto configuration (928). If there is another machine exceeding its thresholds and electing auto configuration, offload program 900 goes to step 910. If not, offload program 900 stops (930).

Figure 10:
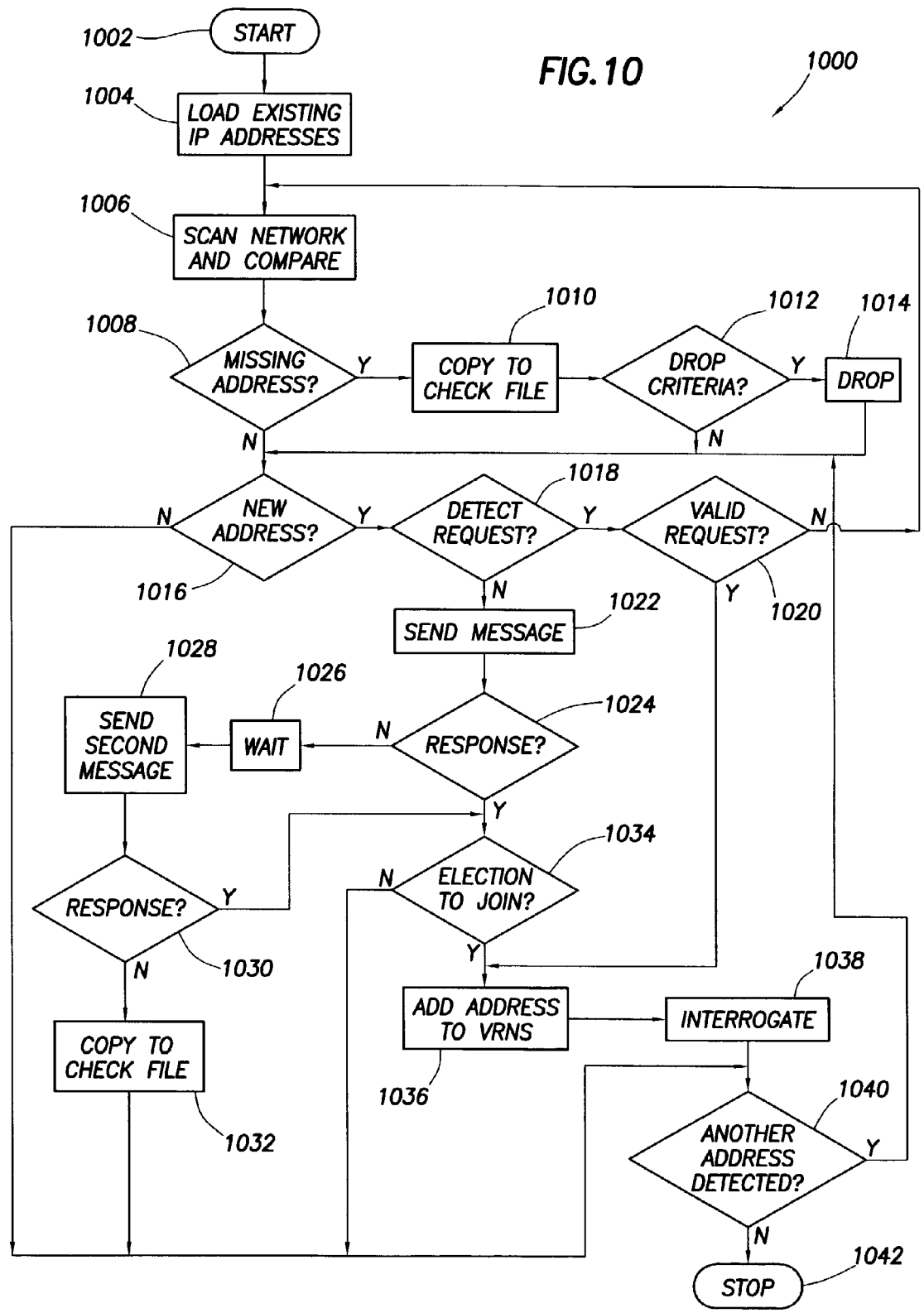
FIG. 10 is a flowchart of the agent program.

FIG. 10 depicts the flowchart of agent program 1000, similar to agent program 410. Agent program 1000 starts (1002) and loads the existing IP address list from memory (1004). Agent program 1000 scans the network for IP addresses and compares the addresses found, if any, to the existing IP address list in memory (1006). A determination is made as to whether there are missing addresses (1008). In other words, agent program 1000 checks to see if any addresses on the IP address list are not on the network. If not, agent program 1000 goes to step 1016. If an address is missing, the address is copied to a check file (1010). A determination is made as to whether the address in the check file meets criteria for being dropped from the check file and from the IP address list (1012). The criteria for dropping can be established by the system administrator based on time in the check file, a withdrawal by the IP address from the VNRS system, or any criteria desired by persons skilled in the art. If the drop criteria are met, the IP address is dropped (1014). If not, agent program 1000 goes to step 1016.

A determination is made as to whether the IP address is a new address (1016). A new address is defined as an IP address that is not on the IP address list. If the IP address is not a new address, agent program 1000 goes to step 1040. If the IP address is a new address, a determination is made as to whether a request is detected from that address (1018). In other words, has the IP address elected to join the VNRS system, has a message to that effect been sent, and has the message has been received by agent program 1000. If a request is detected, then a determination is made as to whether the request is valid (1020). If the request is not valid, agent program 1000 goes to step 1006. If the request is valid, agent program 1000 goes to step 1036. If at step 1018 a request is not detected, a message is sent to the IP address (1022) requesting an election. A determination is made as to whether a response is received (1024). If a response is received, agent program 1000 goes to step 1034.

If at step 1024, a response was not received, agent program 1000 waits a predetermined amount of time (1026) and then sends a second message (1028). A determination is made as to whether a response has been received to the second message (1030). If a response has not been received, the address is copied to the check file (1032) and agent program 1000 goes to step 1040. If a response was received, Agent program 1000 goes to step 1034.

A determination is made as to whether an election to join the VNRS system was made (1034). If an election to join was not made, agent program 000 goes to step 1040. If an election to join was made, the IP address is added to the VNRS network (1036). The IP address is interrogated by interrogation program 700 to obtain current CPU utilization, current RAM utilization data, and a listing of available applications (1038). A determination is made if another IP address is detected (1040). If so, agent program 1000 goes to step 1016. If not, agent program 1000 ends (1042).

Figure 11:
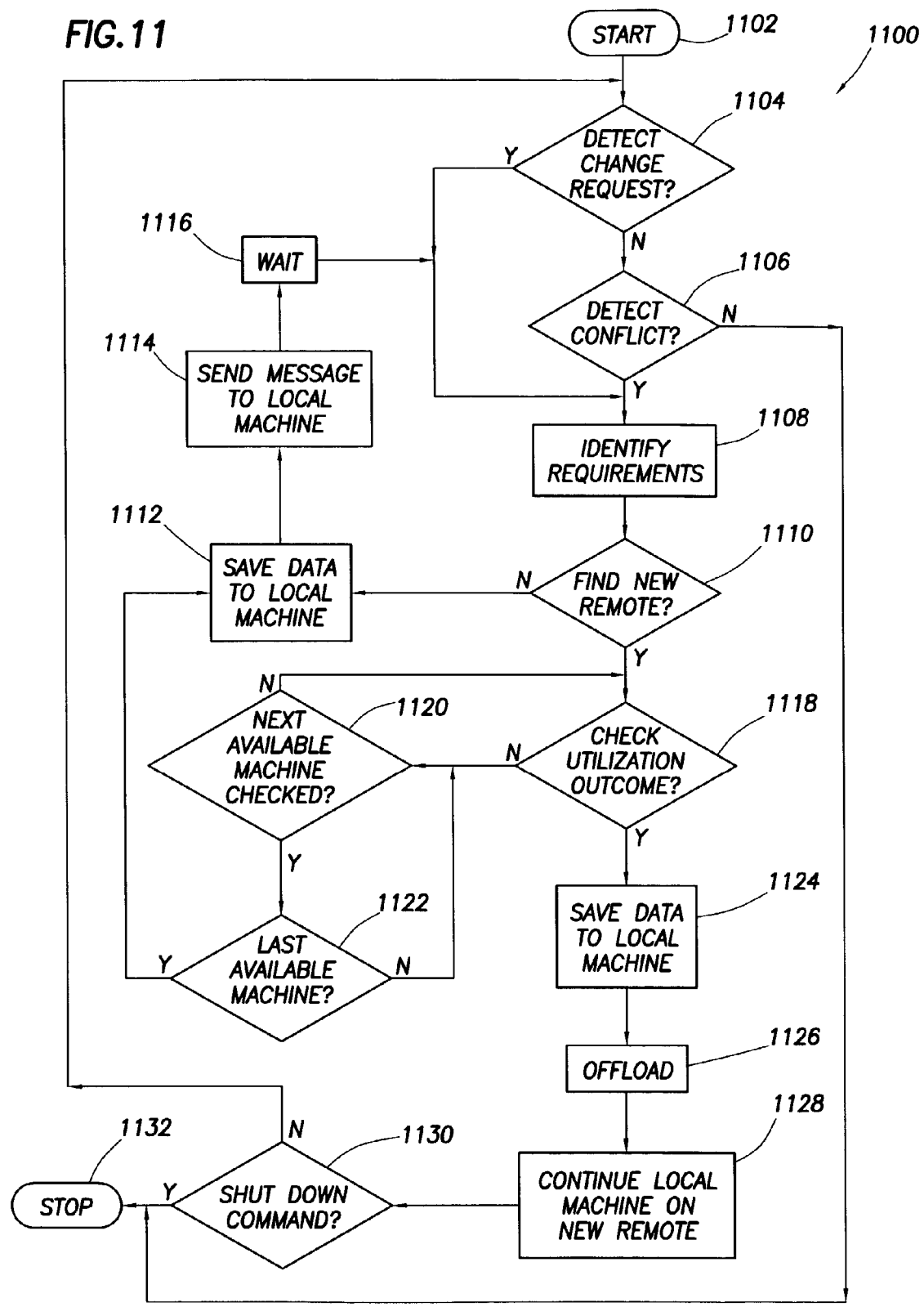
FIG. 11 is a flowchart of the conflict resolution program.

FIG. 11 is a flowchart of conflict resolution program 1100. Conflict resolution program 1100 begins (1102). A determination is made as to whether a change request has been detected (1104). If a change request has been detected, conflict resolution program 1100 goes to step 1108. If not, conflict resolution program 1100 goes to step 1106. A determination is made as to whether a conflict has been identified (1106). If so, conflict resolution program 1100 goes to step 1108. If a conflict has not been identified, conflict resolution program 1100 stops (1132). At step 1108 conflict resolution program 1100 identifies the requirements needed by the local machine so that a new remote machine may be found (1108). A determination is made as to whether a new remote machine can be found (1110). If a new remote machine cannot be found, data is saved to the local machine (1112) and a message is sent to the local machine (1114). Conflict resolution program 1100 waits a predetermined amount of time (1116) and then goes to step 1108. If at step 1118, a check on the utilization outcome of the offloading is not favorable, then a determination is made as to whether the next available machine has been checked (1120). If the next available machine has not been checked, the utilization outcome is determined for that machine at step 1118. If the next available machine has been checked, a determination is made as to whether the last available machine has been checked (1122). If not, conflict resolution program 1100 goes to step 1120. If the last available machine has been checked, conflict resolution program 1100 goes to step 1112.

If at step 1110 a new remote machine is found, conflict resolution program 1100 checks the utilization outcome of the new remote machine (1118). If the check is positive, then data is saved at the local machine (1124) and processes are offloaded to the new remote machine (1126). Conflict resolution program 1100 continues processing the local machine on the new remote machine (1128). A determination is made as to whether a shut down command has been received (1130). If a shut down command has been received, conflict resolution program 1100 stops (1132). If a shut down command has not been received, conflict resolution program 1100 goes to step 1104.

Figure 12:
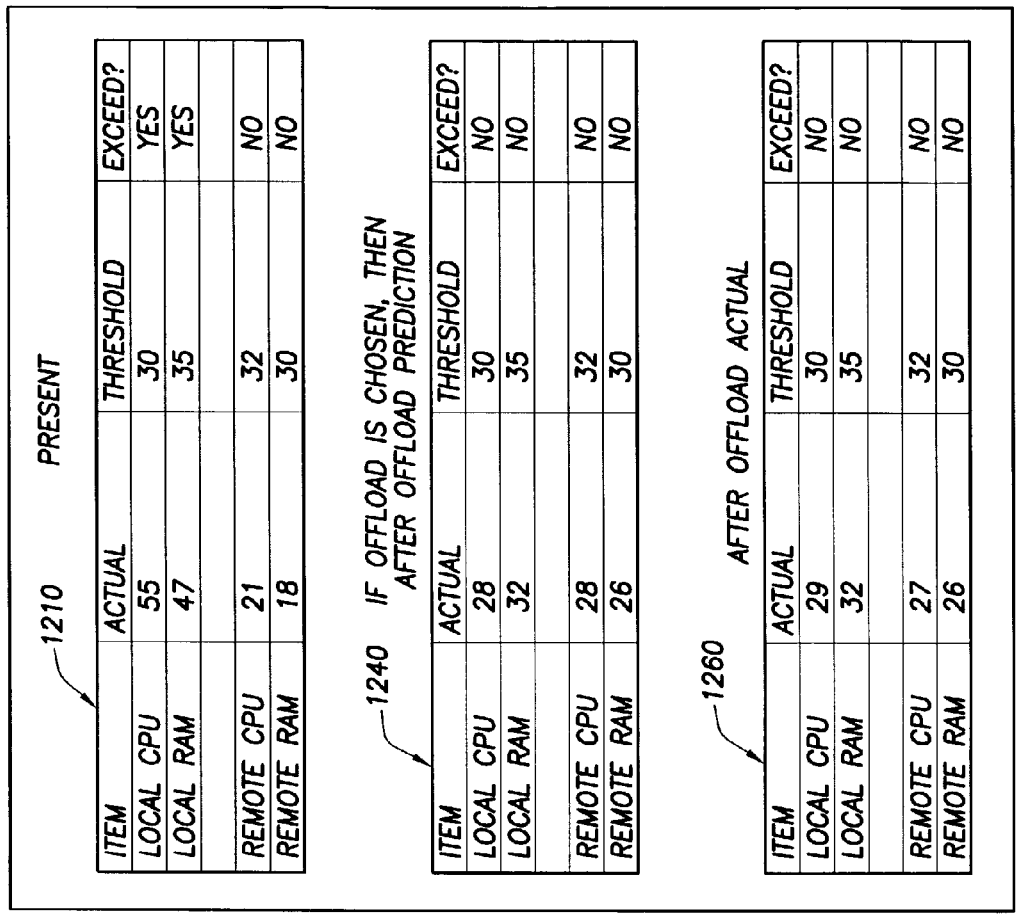
FIG. 12 illustrates the improved efficiency of two computers running the VNRS software.

FIG. 12 illustrates the improved efficiency of two computers operating the VNRS software described herein. Table 1210 illustrates the CPU and RAM usage (in percent used) for both the local computer and the remote computer. The actual usage and the threshold usage are displayed along with a determination of whether the actual usage exceeds the threshold usage. Since table 1210 illustrates that the actual usage exceeds the threshold usage on the local computer, it would be beneficial for the local computer to offload some applications to the remote computer so that both computers will operate more efficiently.

Table 1240 shows the predicted usage values of both machines. VNRS program 400 can predict the usage for each machine after offloading based on the present loading requirements of each machine. Table 1260 illustrates the usage of the two machines after VNRS program 400 has offloaded some applications from the local machine to the remote machine. The result of the offloading is that the two computers will operate more efficiently than the configuration in table 1210.

Figure 13:
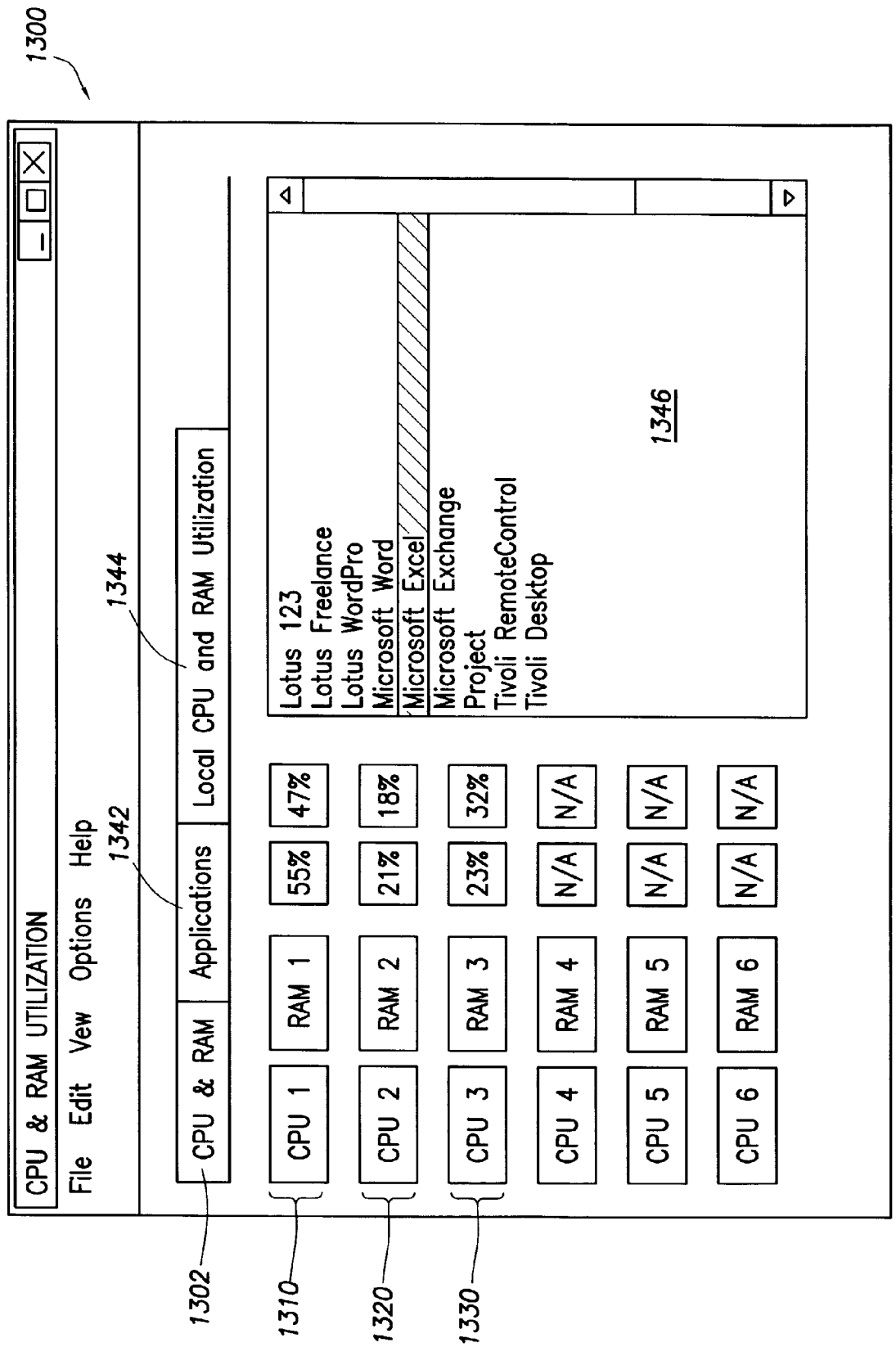
FIG. 13 depicts CPU and RAM utilization graphical user interface.

FIG. 13 depicts CPU utilization graphical user interface (GUI) 1300. The CPU tab 1302 in FIG. 13 shows three computers (CPU1, RAM1; CPU2, RAM2; and CPU3, RAM2) which are networked together. The data pertaining to CPU1 and RAM1 is illustrated in row 1310. The data pertaining to CPU2 and RAM2 is illustrated in row 1320. The data pertaining to CPU3 and RAM3 is illustrated in row 1330. Applications screen 1346 shows the applications currently running on the three computers. Highlighting a particular application (Microsoft Excel) will highlight a corresponding CPU and RAM to indicate which machine the application is running on. For more details about the particular applications, the user can click on the applications tab 1342. For additional information about each machine's CPU and RAM usage, the user can click on the local CPU and RAM utilization tab 1344. Additional information may include a history listing of CPU and RAM utilization and processing times for the different utilization figures.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A programmable apparatus comprising:
a plurality of participating client computers connected by a network to a server computer;
a program installed on the server computer;
wherein the program causes the sewer computer to perform the following steps:
identify a plurality of participating computers on a virtual network by Internet Protocol address;
create a network of the plurality of participating computers;
identify a CPU and a RAM for each of the participating computers;
designate a CPU utilization threshold and a RAM utilization threshold for each of said plurality of participating computers;
identify a CPU utilization and a RAM utilization for each of the plurality of participating computers;
identify a plurality of applications located in the memory of each of the plurality of participating computers;
monitor a CPU and RAM utilization for each CPU and RAM in each of the plurality of participating computers;
responsive to a determination that a CPU utilization and a RAM utilization for a first computer has exceeded a CPU utilization threshold and a RAM utilization threshold for the first computer, select an application located in the memory of the first computer, and select a second participating computer on which to run the application using a CPU and a RAM of a second participating computer;
wherein the selection of the application and the selection of the second participating computer are made by determining that removal of the processing of the selected application from the first computer's CPU and RAM and the running of the selected application using the CPU and RAM of the second computer will result in the CPU and RAM utilization of the first computer to be below the first computer's CPU and RAM utilization threshold and will result in the CPU and RAM utilization of the second computer to be below the second computer's CPU and RAM utilization threshold; and
responsive to running the selected application on the second computer's CPU and RAM, releasing a RAM from the first computer.

2. The programmable apparatus of claim 1 further comprising:
a first graphical user interface adapted to display, in a first table, present values for the first participating computer's actual CPU and RAM values, the first computer's threshold CPU and RAM values, the second computer's actual CPU and RAM values, the second computer's threshold CPU and RAM values, and whether the first computer has exceed a first computer threshold value and whether the second computer has exceed a second computer threshold value.

3. The programmable apparatus of claim 2 wherein the graphical user interface further comprises:
a second table displaying a prediction of an actual value for the first computer's CPU utilization and RAM utilization and the second computer's CPU utilization and RAM utilization after the program is running on the second computer, and whether a first computer's CPU threshold and RAM threshold have been exceeded and whether a second computer's CPU threshold and RAM threshold have been exceeded.

4. The programmable apparatus of claim 3 wherein the graphical user interface further comprises:
a third table displaying an actual value for the first computer's CPU and RAM utilization after the program is running on the second computer, and displaying whether the CPU and RAM thresholds for the first computer and for the second computer have been exceeded.

5. The programmable apparatus of claim 1 further comprising:
a second graphical user interface comprising having an application screen adapted to display a plurality of applications currently running on a plurality of computers wherein highlighting one of the plurality of applications will highlight a corresponding CPU and RAM value to indicate on which computer the application is running.

6. The programmable apparatus of claim 5 further comprising:
an applications tab, which when activated, will display additional information about a particular application; and
a CPU and RAM utilization tab, which when activated, will display a history listing of CPU and RAM utilization and processing times.

7. A computer implemented process comprising:
identifying a plurality of participating computers on a virtual network by Internet Protocol address;
creating a network of the plurality of participating computers;
designating a CPU utilization threshold and a RAM utilization threshold for each of said plurality of participating computers;
identifying a CPU utilization and a RAM utilization for each of the plurality of participating computers, and identifying a plurality of applications located in the memory of each of the plurality of participating computers;
monitoring a CPU and RAM utilization for each CPU and RAM in each of the plurality of participating computers;
responsive to a determination that a CPU utilization and a RAM utilization for a first computer has exceeded a CPU utilization threshold and a RAM utilization threshold for the first computer, running a selected application from the plurality of applications located in the memory of the first participating computer using a CPU and a RAM of a second participating computer; and
wherein the selection of the application and the selection of the second participating computer are made by determining that removal of the processing of the selected application from the first computer's CPU and RAM and the running of the selected application using the CPU and RAM of the second computer will result in the CPU and RAM utilization of the first computer being below the first computer's CPU and RAM utilization threshold and will result in the CPU and RAM utilization of the second computer being below the second computer's CPU and RAM utilization threshold; and
responsive to running the selected application on the second computer's CPU and RAM, releasing a RAM from the first computer.

8. The computer implemented process of claim 7 further comprising:
using a first graphical user interface, displaying, in a first table, present values for the first participating computer's actual CPU and RAM values, the first computer's threshold CPU and RAM values, the second computer's actual CPU and RAM values, the second computer's threshold CPU and RAM values, and whether the first computer has exceeded a first computer threshold value and whether the second computer has exceeded a second computer threshold value.

9. The computer implemented process of claim 8 further comprising:
using the first graphical user interface, displaying, in a second table, a prediction of an actual value for the first computer's CPU utilization and RAM utilization and the second computer's CPU utilization and RAM utilization after the program is running on the second computer, and whether a first computer's CPU threshold end RAM threshold have been exceeded and whether a second computer's CPU threshold and RAM threshold have been exceeded.

10. The computer implemented process of claim 9 further comprising:
using the first graphical user interface, displaying, in a third table an actual value for the first computer's CPU and RAM utilization after the program is running on the second computer, and whether the CPU and RAM thresholds for the first computer and for the second computer have been exceeded.

11. The programmable apparatus of claim 7 further comprising:
a second graphical user interface comprising having an application screen adapted to display a plurality of applications currently running on a plurality of computers wherein highlighting one of the plurality of applications will highlight a corresponding CPU and RAM value to indicate on which computer the application is running.

12. The programmable apparatus of claim 11 further comprising:
an applications tab, which when activated, will display additional information about a particular application; and
a CPU and RAM utilization tab, which when activated, will display a history listing of CPU and RAM utilization and processing times.

* * * * *